(12) United States Patent
Baughman et al.

(10) Patent No.: US 8,150,785 B2
(45) Date of Patent: Apr. 3, 2012

(54) MULTI-MODAL GREEN COMPUTING FUSION USING PROBLEM ANALYTICS

(75) Inventors: Aaron K. Baughman, Silver Spring, MD (US); Eric S. Christensen, Bethesda, MD (US); Christopher J. Dawson, Arlington, VA (US); Barry Graham, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 12/328,825

(22) Filed: Dec. 5, 2008

(65) Prior Publication Data

US 2010/0146336 A1    Jun. 10, 2010

(51) Int. Cl.
  *G06F 11/07*    (2006.01)
(52) U.S. Cl. .......................................................... 706/45
(58) Field of Classification Search ...................... 706/12
  See application file for complete search history.

(56) References Cited

U.S. PATENT DOCUMENTS

| 7,062,508 | B2 | 6/2006 | Andreev et al. | |
|---|---|---|---|---|
| 7,895,142 | B2 * | 2/2011 | Neigovzen et al. | 706/45 |
| 2004/0138863 | A1 | 7/2004 | Simkins | |
| 2006/0158326 | A1 | 7/2006 | Easley | |

OTHER PUBLICATIONS

Yong Sun et al., "An Efficient Unification-based multimodal Language Processor in Multimodal Input Fusion", OzCHI 2007 Proceedings, Nov. 2007.
Kim et al., "Optimal Kernel Selection in Kernel Fisher Discriminant Analysis", Proceedings of the 23rd International Conference on Machine Learning, Pittsburgh, PA, 2006.
McKelvin, Jr. et al., "A Formal Approach to Fault Tree Synthesis for the Analysis of Distributed Fault Tolerant Systems", EMSOFT '05, Sep. 19-22, 2005, Jersey City, New Jersey.

* cited by examiner

*Primary Examiner* — Jeffrey A Gaffin
*Assistant Examiner* — Ola Olude-Afolabi
(74) *Attorney, Agent, or Firm* — Douglas Lashmit; Hoffman Warnick LLC

(57) ABSTRACT

A system, method and program product for processing a computational problem for a computing center having a plurality of computing resources. The system includes: a problem analytics system for generating a characterized problem description from an inputted computational problem using at least one of a keyword nonparametric inverse indexing or a nonparametric data structure analysis; a system for selecting a model that resembles the characterized problem description by comparing the characterized problem description with a set of models; and a system for generating a computing solution for running the inputted computational problem on the computing center based on a selected model and a set of environment factors associated with the computing center.

24 Claims, 2 Drawing Sheets

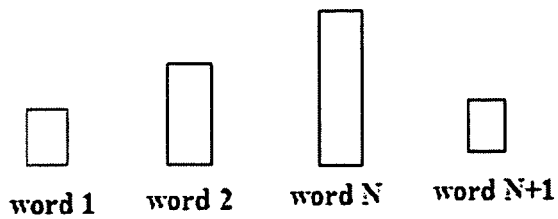
FIG. 2
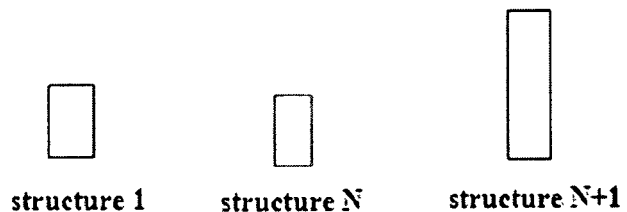
FIG. 3
Data Center Ecology Instance
Input Power: Xi
Heat Output: Xo
Air Flow: Xa
Footprint: Xf
Height Xh
Input Products: $\overline{Xsi}$
Output Products: $\overline{Xop}$
Runtime Scalar: Xr
Sensor Input Scalars: $\overline{Xsi}$
$$\overline{X} = \sum_{k=1}^{N} 2^k$$
Adenine + Cytosine + Guanine + Thymine = 30
  2   +    4    +    8    +   16    = 30
Adenine & 30 = true
Water & 30 = false
FIG. 4

MULTI-MODAL GREEN COMPUTING FUSION USING PROBLEM ANALYTICS

FIELD OF THE INVENTION

This disclosure relates generally to determining how to approach and implement a computational problem on a computing center, and more particularly to a system and method of enabling multi-modal green computing fusion of a green ecology with problem analytics.

BACKGROUND OF THE INVENTION

Computing environments, such as information technology (IT) datacenters, are tasked with processing complex computing problems that consume significant computational resources. In most cases there may be any number of approaches that could be used to tackle the problem, e.g., parallel processing, distributed processing, etc. In addition, there may be disparate computing infrastructures or resources available to solve the problem, super computers, DNA computing, grid computing, quantum computing, etc.

However, current approaches for determining the best way to process a complex problem do not effectively account for the environment factors associated with the computing environment. Computing environments and associated machinery are neither environmentally aware nor complementary towards the environment. For example, the most robust method for solving a problem may include a combination of DNA and quantum computing. However, DNA computing generally requires significant water and quantum computing may generate significant amounts of heat. Using these infrastructures on a hot day during a drought is probably not the most environmentally effective approach.

Although complex problems are modeled for execution by a computing center, metadata or the like that describes the problem does not lend itself towards environmental awareness. Even if the problem is understood, current computing center analysis lacks any context of the environment.

SUMMARY OF THE INVENTION

The present invention relates to a system, method and program product for processing a computational problem targeted for a computing center. In one embodiment, there is a system for processing a computational problem targeted for a computing center having a plurality of computing resources, comprising: a problem analytics system for generating a characterized problem description from an inputted computational problem using at least one of a keyword nonparametric inverse indexing or a nonparametric data structure analysis; a system for selecting a model that resembles the characterized problem description by comparing the characterized problem description with a set of models; and a system for generating a computing solution for running the inputted computational problem on the computing center based on a selected model and a set of environment factors associated with the computing center.

In a second embodiment, there is a computer program product stored on a computer readable medium for processing a computational problem for a computing center having a plurality of computing resources, comprising: program code for generating a characterized problem description from an inputted computational problem using at least one of a keyword nonparametric inverse indexing or a nonparametric data structure analysis; program code for selecting a model that resembles the characterized problem description by comparing the characterized problem description with a set of models; and program code for generating a computing solution for running the inputted computational problem on the computing center based on a selected model and a set of environment factors associated with the computing center.

In a third embodiment, there is a method for processing a computational problem for a computing center having a plurality of computing resources, comprising: generating a characterized problem description from an inputted computational problem using at least one of a keyword nonparametric inverse indexing or a nonparametric data structure analysis; selecting a model that resembles the characterized problem description by comparing the characterized problem description with a set of models; and generating a computing solution for running the inputted computational problem on the computing center based on a selected model and a set of environment factors associated with the computing center.

In a fourth embodiment, there is a method for deploying a system for processing a computational problem for a computing center having a plurality of computing resources, comprising: providing a computer infrastructure being operable to: generate a characterized problem description from an inputted computational problem using at least one of a keyword nonparametric inverse indexing or a nonparametric data structure analysis; select a model that resembles the characterized problem description by comparing the characterized problem description with a set of models; and generate a computing solution for running the inputted computational problem on the computing center based on a selected model and a set of environment factors associated with the computing center.

Building green data centers rely on mechanisms to interpret how a computing environment affects the environment. As such, before a problem is processed, analytics that describe a problem need to be implemented to provide the computational requirements of a solution. The computing center must understand the problem before determining processing parameters that are environmentally aware. A novel solution is provided that fuses green center ecology with problem metadata which provides a machine the ability to process a problem with an environmentally friendly method.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 2 depicts a nonparametric inverse index in accordance with an embodiment of the present invention.

FIG. 3 depicts a nonparametric data structure analyzer in accordance with an embodiment of the present invention.

FIG. 4 depicts a computing center ecology instance in accordance with an embodiment of the present invention.

Figure 1:
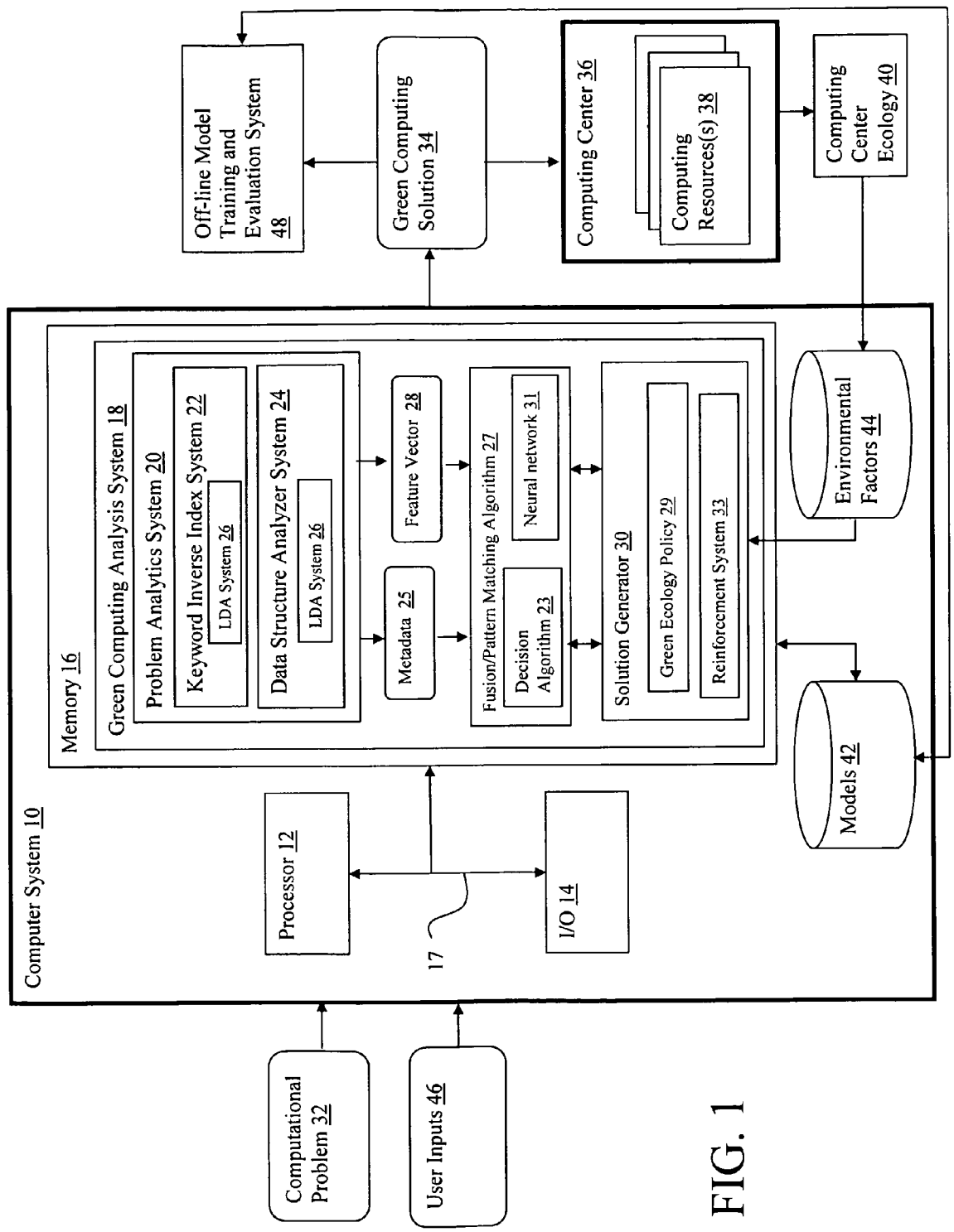
FIG. 1 depicts a computer system having a green computing fusion in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a computer system 10 is shown having a green computing analysis system 18 that analyzes a problem description 32 and generates a green computing solution 34 for a computing center 36. Green computing analysis system 18 may in one embodiment comprise a program product stored on a computer readable medium such as memory 16, which when executed by processor 12 causes computer system 10 to behave in a specific manner detailed herein.

Computational problem 32 may be any type of complex computing problem. For instance, computational problem 32 may involve scheduling airline flights, tasking a satellite, simulating weather patterns, etc. Computational problem 32 may be presented as a textual description, or in some other form such as structured data. Computing center 36 may comprise a plurality of computing resources 38 capable of implementing part or all of the solution for the computational problem 32. Illustrative computing resources 38 may include, e.g., grid computing, DNA computing, quantum computing, super computing, etc. Green computing analysis system 18 calculates a preferred manner for "hoisting" a solution onto the computing center 36 that takes into account environmental factors 44, such as temperature, weather, water availability, resources, etc. For example, data center 36 may be tasked to process flight scheduling and routing for an airline, in which weather, cancellations, maintenance issues, etc., must be accounted for in a dynamic fashion. Based on various environmental factors 44 associated with the computing center, it may be determined that a particular approach using a supercomputer and a DNA computer in parallel is the best solution for the above airline problem in terms of a balance between performance and environment impact. At other times, different environmental factors 44 may dictate a different approach for the same problem 32 (e.g., during winter versus summer).

Green computing analysis system 18 generally includes a problem analytics system 20 that characterizes the problem 32 in terms of metadata 25 and/or a feature vector 28. In particular, the problem 32 may be characterized by keyword inverse index system 22 that a characterized problem description as metadata 25 with nonparametric inverse indexing, such as the histogram shown in FIG. 2. Each nonparametric index is fused together with a linear discriminate analysis system 26 (LDA). Alternatively, the characterized problem description may comprise a feature vector 28 by a data structure analyzer system 24 that describes the computational problem 32 with a nonparametric data structure analysis, such as that shown in FIG. 3. (Note that a histogram is a simple nonparametric estimate of a probability distribution—other known nonparametric estimates could likewise be utilized.) Data structure analyzer system 24 likewise uses an LDA system 26.

Once a character problem description is obtained, the description can be compared to predefined models 42 either through a similarity score or a neural network 31. A neural network 31 is an interconnected group of artificial neurons that uses a mathematical or computational model for information processing based on a connectionistic approach to computation. The neural network 31 is an adaptive system that changes its structure based on external or internal information that flows through the network 31. In more practical terms neural networks are non-linear statistical data modeling or decision making tools. They can be used to model complex relationships between inputs and outputs or to find patterns in data.

In one illustrative embodiment, a linear discriminate analysis (LDA) system 26 is provided to generate a similarity score for each model 42, according to the equation:

$$\text{similarity} = \sum_{i=0}^{n} \frac{a * x_i}{b * m_i} + \sum_{j=0}^{w} \frac{a * t_j}{b * o_j}$$

where:
a=sample linear scalar
b=model linear scalar
x=sample word index
m=model word index
t=sample structure index
o=model structure index The similarity score for each model 42 produces a similarity vector. If a/b is greater than 1, then the highest similarity score is kept. If a/b is less than 1, the lowest similarity score is kept. Finally, if a/b is 1, the score closest to 1 is kept. The model with the closest score scaled with a/b is chosen as a problem descriptor.

The type of descriptor will be a feature vector 28. The feature vector 28 is input into a neural network 31 along with a set of environmental factors 44 (which may also be embodied as a feature vector) from the computing center ecology 40. A green ecology policy 29 provides a concept that is data structure agnostic. The policy 29 allows user inputs 46 or the solution generator 30 to describe the current operating environment. The user may provide weights to each property. A complete metric might be a combination of one or more variables. Uniquely, the green ecology policy accepts environmental factors 44 from external remote sensors. The input provides weighting or precedence levels for a given environmental factor 44 such as water input or air temperature. In addition, an engine within the green ecology policy 29 maps the operating environment into a feature vector for input into a fusion/pattern recognition algorithm 27 provided by the solution generator 30. An illustrative computing center ecology instance is shown in FIG. 4. The green ecology instance is an environmentally aware dictionary. The dictionary can be pre-populated manually or from remote sensors. Further, the ecology instance can be updated as the environment changes with time.

As new problem models 42 and environmental cues are discovered, the training of neural network 31 is handled by offline training and evaluation system 48.

Further, a reinforcement system 33 may be included to handle dynamic system changes. For example, if the net set of neural network weights has not been updated within the production environment or a weight should be emphasized, the reinforcement system 33 biases the network 31 towards a certain output. If the computing center 36 is running in an environment with low available power, the reinforcement system 33 can bias the neural network 31 towards choosing a low power computing infrastructure 38.

When a problem is presented the green computing analysis system 18 without a similar model 42, the problem is stored as a new model. A best guess or the highest similarity score with a given model provides the initial state for evaluation. An offline module provides a separate unit for the retraining of the neural network. In addition, if the best guess is not good, the results of the effects of computing on the environment will alter the model description.

An illustrative scenario of the green computing analysis system may involve processing an airline flight schedule. Using existing approaches, airlines iteratively and crudely develop flight plans based upon existing flight plans. Weather, pilots, gas costs and service demand are not quickly processed for flight plans. The green computing fusion processes described herein would enable a timely solution for multi-variant flight scheduling problems. For example:

1. The green multimodal system is built close to a water treatment facility within a very hot environment.
2. A technician enters a data center policy within the green system that determines the utility of airflow, heat, power, computing inputs, etc.
3. The data center ecology policy is stored within a database. A multitude of data center ecologies are stored that align towards environmental states.
4. A planner submits the flight problem to the multi-modal computing environment. The problem is associated with metadata that describes the problem and data structures.
5. The first fusion compares the problem and metadata with other similar problems. A similarity score is built for each model.
6. The second fusion scores each model with a computing paradigm. As a result, a second score is an environmental aware metric.
7. The combination of the environmental aware metric and the model similarity metric hoist the flight scheduling problem on the DNA computing nodes.
8. The problem is encoded into A, C, T and G DNA strands. The computing completes quickly.
9. As a result, the airline is able to produce a daily flight plan.
10. In addition, the performance of the problem is stored within the model database.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a video surveillance system 18 could be created, maintained and/or deployed by a service provider that offers the functions described herein for customers. That is, a service provider could offer to deploy or provide a green computing solution 34 as described above.

It is understood that in addition to being implemented as a system and method, the features may be provided as a program product stored on a computer-readable medium, which when executed, enables computer system 10 to provide green computing analysis system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for processing a computational problem for a computing center having a plurality of computing resources, comprising:
   a computer system having a processor and memory, and including:
   a problem analytics system for generating a characterized problem description from an inputted computational problem using at least one of a keyword nonparametric inverse indexing or a nonparametric data structure analysis;
   a system for selecting a model that resembles the characterized problem description by comparing the characterized problem description with a set of models; and
   a system for generating a computing solution for running the inputted computational problem on the computing center based on a selected model and a set of environment factors associated with the computing center.

2. The system of claim 1, wherein the system for selecting the model utilizes a pattern matching algorithm.

3. The system of claim 2, wherein the pattern matching algorithm includes a linear discriminate analysis that calculates a similarity score for each model from the set of models.

4. The system of claim 1, wherein the system for selecting the model utilizes a decision algorithm based on metadata.

5. The system of claim 1, wherein the computing resources of the computing center are selected from a group consisting of: a super computer, a DNA computer, a quantum computer, and a grid computer.

6. The system of claim 1, further comprising an off-line model training and evaluation system.

7. The system of claim 1, wherein the system for generating a computing solution includes a neural network.

8. The system of claim 7, further comprising a reinforcement system for altering a behavior of the neural network.

9. A computer program product stored on a computer readable storage medium for processing a computational problem for a computing center having a plurality of computing resources, comprising:
   program code for generating a characterized problem description from an inputted computational problem using at least one of a keyword nonparametric inverse indexing or a nonparametric data structure analysis;
   program code for selecting a model that resembles the characterized problem description by comparing the characterized problem description with a set of models; and
   program code for generating a computing solution for running the inputted computational problem on the computing center based on a selected model and a set of environment factors associated with the computing center.

10. The computer program product of claim 9, wherein the program code for selecting the model utilizes a pattern matching algorithm.

11. The computer program product of claim 10, wherein the pattern matching algorithm includes a linear discriminate analysis that calculates a similarity score for each model from the set of models.

12. The computer program product of claim 9, wherein the program code for selecting the model utilizes a decision algorithm based on metadata.

13. The computer program product of claim 9, wherein the computing resources of the computing center are selected from a group consisting of: a super computer, a DNA computer, a quantum computer, and a grid computer.

14. The computer program product of claim 9, further comprising program code for providing off-line model training and evaluation.

15. The computer program product of claim 9, wherein the program code for generating a computing solution includes a neural network.

16. The computer program product of claim 15, further comprising program code for altering a behavior of the neural network.

17. A method for processing a computational problem for a computing center having a plurality of computing resources, comprising:
   utilizing a computer system having a processor and a memory to perform:
   generating a characterized problem description from an inputted computational problem using at least one of a keyword nonparametric inverse indexing or a nonparametric data structure analysis;
   selecting a model that resembles the characterized problem description by comparing the characterized problem description with a set of models; and
   generating a computing solution for running the inputted computational problem on the computing center based on a selected model and a set of environment factors associated with the computing center.

18. The method of claim 17, wherein selecting the model utilizes a pattern matching algorithm.

19. The method of claim 18, wherein the pattern matching algorithm includes a linear discriminate analysis that calculates a similarity score for each model from the set of models.

20. The method of claim 17, wherein selecting the model utilizes a decision algorithm based on metadata.

21. The method of claim 17, wherein the computing resources of the computing center are selected from a group consisting of: a super computer, a DNA computer, a quantum computer, and a grid computer.

22. The method of claim 17, further comprising providing off-line model training and evaluation.

23. The method of claim 17, wherein generating a computing solution includes utilizing a neural network.

24. The method of claim 23, further comprising altering a behavior of the neural network.

* * * * *